United States Patent
Yokotsuji et al.

(10) Patent No.: US 10,276,871 B2
(45) Date of Patent: Apr. 30, 2019

(54) RECHARGEABLE LITHIUM BATTERY

(71) Applicant: SAMSUNG SDI CO., LTD., Yongin-si, Gyeonggi-do (KR)

(72) Inventors: Hokuto Yokotsuji, Yokohama (JP); Hironari Takase, Yokohama (JP)

(73) Assignee: Samsung SDI Co., Ltd., Yongin-si (KR)

(*) Notice: Subject to any disclaimer, the term of this patent is extended or adjusted under 35 U.S.C. 154(b) by 584 days.

(21) Appl. No.: 14/961,669

(22) Filed: Dec. 7, 2015

(65) Prior Publication Data
US 2016/0164096 A1    Jun. 9, 2016

(30) Foreign Application Priority Data

Dec. 9, 2014    (JP) ................................. 2014-248837
Oct. 23, 2015   (KR) ........................ 10-2015-0148210

(51) Int. Cl.
*H01M 4/62* (2006.01)
*H01M 10/0567* (2010.01)
*H01M 4/134* (2010.01)
*H01M 4/133* (2010.01)
*H01M 4/36* (2006.01)
*H01M 10/42* (2006.01)
*H01M 10/0525* (2010.01)
*H01M 10/0569* (2010.01)
*H01M 4/38* (2006.01)
*H01M 4/587* (2010.01)
*H01M 4/131* (2010.01)

(52) U.S. Cl.
CPC ............ *H01M 4/62* (2013.01); *H01M 4/133* (2013.01); *H01M 4/134* (2013.01); *H01M 4/364* (2013.01); *H01M 10/0567* (2013.01); *H01M 10/4235* (2013.01); *H01M 4/131* (2013.01); *H01M 4/382* (2013.01); *H01M 4/386* (2013.01); *H01M 4/587* (2013.01); *H01M 10/0525* (2013.01); *H01M 10/0569* (2013.01)

(58) Field of Classification Search
CPC ........ H01M 4/62; H01M 4/134; H01M 4/133; H01M 4/364; H01M 4/386; H01M 4/587; H01M 4/131; H01M 4/382; H01M 10/0567; H01M 10/4235; H01M 10/0525; H01M 10/0569
See application file for complete search history.

(56) References Cited

U.S. PATENT DOCUMENTS

2004/0106047 A1    6/2004   Mie et al.
2012/0328960 A1    12/2012  Ito et al.
2013/0280622 A1    10/2013  Tokuda et al.
2013/0337314 A1    12/2013  Essaki et al.
2015/0118579 A1    4/2015   Kondo et al.
2016/0164142 A1*   6/2016   Garsuch ............ H01M 10/0568
                                                            429/338
2017/0263974 A1    9/2017   Yamada et al.

FOREIGN PATENT DOCUMENTS

| JP | 2001-229963 A | 8/2001 |
|----|---|---|
| JP | 2004-165151 A | 6/2004 |
| JP | 2006-134684 A | 5/2006 |
| JP | 2008-210618 A | 9/2008 |
| JP | 2011-249058 A | 12/2011 |
| JP | 2012-94454 A | 5/2012 |
| JP | 2012-238458 A | 12/2012 |
| JP | 2013-30473 A | 2/2013 |
| JP | 2013-089365 A | 5/2013 |
| JP | 2013-251066 A | 12/2013 |
| JP | 2014-2890 A | 1/2014 |
| JP | 2014-032802 A | 2/2014 |
| JP | 2014-203781 A | 10/2014 |
| KR | 10-2014-0007000 A | 1/2014 |
| WO | WO 2012/172723 A1 | 12/2012 |

OTHER PUBLICATIONS

Japanese Office Action dated Nov. 20, 2018, for corresponding Japanese Patent Application No. 2014-248837 (5 pages).
Japanese Decision of Rejection dated Mar. 5, 2019 for corresponding Japanese Patent Application No. 2014-248837, 6 pages.

* cited by examiner

*Primary Examiner* — Laura Weiner
(74) *Attorney, Agent, or Firm* — Lewis Roca Rothgerber Christie LLP

(57) ABSTRACT

A rechargeable lithium battery includes a negative electrode including a negative active material including a silicon-based material and a carbon-based material; and an electrolyte solution, wherein the negative electrode further includes greater than or equal to about 0.01 parts by weight and less than or equal to about 1 part by weight of a compound represented by Chemical Formula 1, based on 100 parts by weight of the negative active material, and at least one, selected from the electrolyte solution and the negative electrode, includes greater than or equal to about 0.1 wt % and less than or equal to about 2 wt % of lithium fluorosulfonate and/or lithium bis(fluorosulfonyl)imide, based on the total weight of the electrolyte solution:

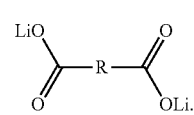

Chemical Formula 1

7 Claims, 1 Drawing Sheet

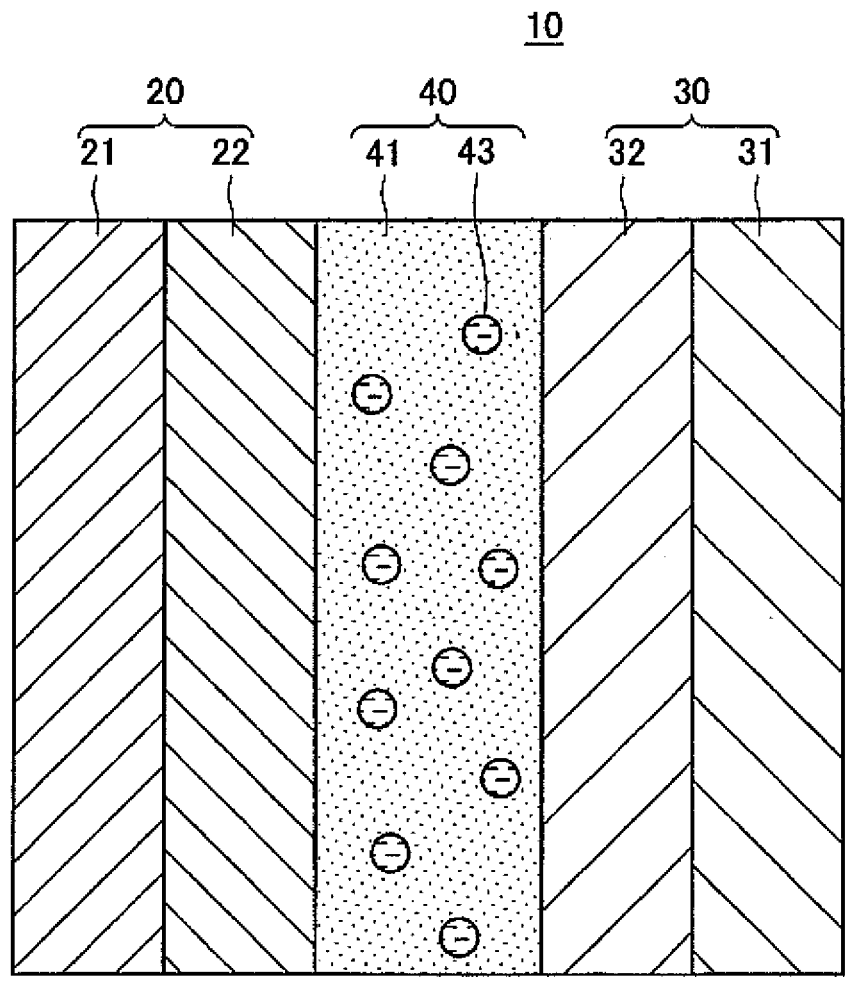

RECHARGEABLE LITHIUM BATTERY

CROSS-REFERENCE TO RELATED APPLICATIONS

This application claims priority to and the benefit of Japanese Patent Application No. 2014-248837 filed in the Japanese Patent Office on Dec. 9, 2014, and Korean Patent Application No. 10-2015-0148210 filed in the Korean Intellectual Property Office on Oct. 23, 2015. Each of the aforementioned applications is incorporated by reference herein in its entirety.

BACKGROUND

1. Field

One or more aspects of embodiments of the present disclose are directed towards a rechargeable lithium battery.

2. Description of the Related Art

Recently, a lithium ion rechargeable battery having high capacity, as well as a high voltage, has been widely adopted as a power source for various portable devices. In addition, there has been an increasing number of attempts to adopt this lithium ion rechargeable battery for large-sized devices such as an electric tool, an electric bicycle, and electric vehicle, and/or the like. Accordingly, a rechargeable lithium battery having higher capacity and capable of sufficient consecutive operation time is desired. For example, a method of increasing capacity of the rechargeable lithium battery by using a material capable of intercalating and deintercalting more lithium ions (such as silicon (Si), tin (Sn), and/or the like) as a negative active material has been suggested. However, such material has a large volume change due to intercalation and deintercalation of lithium ions, and thus the lithium battery may not have satisfactory (or suitable) cycle characteristics during repetitive charges and discharges. Accordingly, a method of improving cycle characteristics of the rechargeable lithium battery by adding a particular additive to an electrolyte solution has been disclosed. However, the disclosed additive does not sufficiently improve cycle characteristics of the rechargeable lithium battery.

SUMMARY

One or more aspects of embodiments of the present disclosure are directed towards a rechargeable lithium battery having improved cycle-life characteristics.

One embodiment provides a rechargeable lithium battery that includes a negative electrode including a negative active material including a silicon-based material and a carbon-based material; and an electrolyte solution, wherein the negative electrode further includes greater than or equal to about 0.01 parts by weight and less than or equal to about 1 part by weight of a compound represented by Chemical Formula 1, based on 100 parts by weight of the negative active material; and at least one, selected from the electrolyte solution and the negative electrode, includes greater than or equal to about 0.1 wt % and less than or equal to about 2 wt % of lithium fluorosulfonate and/or lithium bis(fluorosulfonyl)imide, based on the total weight of the electrolyte solution:

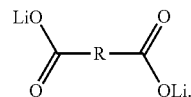

Chemical Formula 1

In Chemical Formula 1,

R may be selected from a single bond, a substituted or unsubstituted C1 to C4 alkylene group, a substituted or unsubstituted C1 to C4 haloalkylene group, a substituted or unsubstituted C2 to C4 alkenylene group, and a substituted or unsubstituted C2 to C4 alkynylene group.

In Chemical Formula 1, R may be a single bond or a substituted or unsubstituted C1 to C4 alkylene group.

The electrolyte solution may include a halogen-substituted cyclic carbonate.

The halogen-substituted cyclic carbonate may include 4-fluoro-1,3-dioxolan-2-one.

Other embodiments are included in the following detailed description.

According to embodiments of the present disclosure, a rechargeable lithium battery having improved cycle-life characteristics may be realized.

BRIEF DESCRIPTION OF THE DRAWING

The accompanying drawing, together with the specification, illustrates embodiments of the present disclosure, and, together with the description, serves to explain the principles of the present disclosure. The drawing is a schematic view showing a structure of a rechargeable lithium battery according to an embodiment of the present disclosure.

DETAILED DESCRIPTION

Hereinafter, embodiments of the present disclosure are described in more detail. However, these embodiments are examples, the present invention is not limited thereto and is defined by the scope of the claims and their equivalents.

As used herein, when specific definition is not otherwise provided, it will be understood that when an element such as a layer, film, region, or substrate is referred to as being "on" another element, it can be directly on the other element or intervening elements may also be present.

Expressions such as "at least one of," "one of," "at least one selected from," and "one selected from," when preceding a list of elements, modify the entire list of elements and do not modify the individual elements of the list. Further, the use of "may" when describing embodiments of the present invention refers to "one or more embodiments of the present invention."

Hereinafter, a rechargeable lithium battery according to one embodiment is described.

A rechargeable lithium battery according to one embodiment includes a compound represented by Chemical Formula 1 as a first additive in a negative electrode, and lithium fluorosulfonate (e.g., LiSO$_3$F) and/or lithium bis(fluorosulfonyl)imide (e.g., herein referred to as "LiFSI") as a second additive in the negative electrode and/or an electrolyte solution.

An amount of the compound represented by Chemical Formula 1 as the first additive may be greater than or equal to about 0.01 parts by weight and less than or equal to about 1 part by weight based on 100 parts by weight of a negative active material in the negative electrode, and an amount of the second additive (LiSO$_3$F and/or LiFSI) in the negative electrode and/or in the electrolyte solution may be greater than or equal to about 0.1 wt % and less than or equal to about 2 wt % based on the total weight of the electrolyte solution.

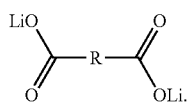

Chemical Formula 1

In Chemical Formula 1, R may be selected from a single bond, a substituted or unsubstituted C1 to C4 alkylene group, a substituted or unsubstituted C1 to C4 haloalkylene group, a substituted or unsubstituted C2 to C4 alkenylene group, and a substituted or unsubstituted C2 to C4 alkynylene group.

When a rechargeable lithium battery according to one embodiment includes a negative electrode manufactured by using negative electrode slurry including a compound represented by the above Chemical Formula 1 (a first additive), the compound represented by Chemical Formula 1 may be selectively decomposed on the negative electrode. In some embodiments, when the decomposed compound represented by Chemical Formula 1 is then mixed with $LiSO_3F$ and/or LiFSI (a second additive) included in the negative electrode and/or an electrolyte solution, a satisfactory (or suitable) passivation film having ion conductivity may be formed on the negative electrode. According to one embodiment, the rechargeable lithium battery may selectively form a satisfactory (or suitable) passivation film having ion conductivity on the negative electrode. Accordingly, the rechargeable lithium battery according to one embodiment may have improved cycle-life characteristics. As used herein, "selectively" may refer to "optionally."

Hereinafter, a rechargeable lithium battery according to one embodiment is described referring to the drawing.

The drawing is a schematic view showing the structure of a rechargeable lithium battery according to one embodiment.

Referring to the drawing, a rechargeable lithium battery 10 may include a positive electrode 20, a negative electrode 30, and a separator layer 40.

A shape of the rechargeable lithium ion battery 10 is not particularly limited, and may have any suitable shape such as a cylinder, a prism laminate-type (e.g., prism laminate), a button, and/or the like.

The positive electrode 20 may include a current collector 21 and a positive active material layer 22 formed on the current collector.

The current collector 21 of the positive electrode 20 may be any suitable conductor (e.g., may be formed of any suitable conducting material), for example, aluminum, stainless steel, and/or nickel plated steel.

The positive active material layer 22 includes a positive active material, and may further include a conductive material and a binder. Amounts of the positive active material, the conductive material, and the binder are not particularly limited.

The positive active material may be, for example, a transition metal oxide including lithium or a solid solution oxide. However, the positive active material is not limited thereto and may be any suitable material capable of electrochemically intercalating and deintercalating lithium ions.

The transition metal oxide including lithium may be a lithium cobalt-based composite oxide (such as $LiCoO_2$ and/or the like), a lithium nickel cobalt manganese based composite oxide (such as $LiNi_xCo_yMn_zO_2$ and/or the like), a lithium nickel-based composite oxide (such as $LiNiO_2$ and/or the like), and/or a lithium manganese-based composite oxide (such as $LiMn_2O_4$ and/or the like). The solid solution oxide may be, for example, $Li_aMn_xCo_yNi_zO_2$ (where $1.150 \leq a \leq 1.430$, $0.45 \leq x \leq 0.06$, $0.10 \leq y \leq 0.15$, and $0.20 \leq z \leq 0.28$), $LiMn_xCo_yNi_zO_2$ (where $0.3 \leq x \leq 0.85$, $0.10 \leq y \leq 0.3$, $0.10 \leq z \leq 0.3$), $LiMn_{1.5}Ni_{0.5}O_4$, and/or the like. The positive active material may be used singularly or a mixture of two or more positive active materials may be utilized.

An amount of the positive active material is not particularly limited, and may be any amount suitable for use in a positive active material layer of a rechargeable lithium battery.

The conductive material may be, for example, carbon black (such as ketjen black, acetylene black, and/or the like), fiber-type carbon (such as natural graphite, artificial graphite, carbon nanotube, graphene, a carbon nano fiber, and/or the like), and/or a composite of the fiber-type carbon and carbon black, but the conductive material is not limited thereto and may be any suitable material capable of improving conductivity of a positive electrode.

An amount of the conductive material is not particularly limited, but may be any ratio or amount suitable for use in a positive active material layer for a rechargeable lithium ion battery.

The binder may be, for example, polyvinylidene fluoride, an ethylene-propylene-diene terpolymer, a styrene-butadiene rubber (SBR), an acrylonitrile-butadiene rubber, a fluoroelastomer, polyvinyl acetate, poly(methyl methacrylate), polyethylene, nitrocellulose, and/or the like, but the binder is not particularly limited so long as it binds the positive active material and the conductive material on the current collector 21 and has oxidation resistance and electrolyte solution stability to endure a high potential of a positive electrode.

An amount of the binder is not particularly limited, but may be any ratio or amount suitable for use in a positive active material layer for a rechargeable lithium ion battery.

The positive active material layer 22 may be, for example, manufactured via the following method. First, a positive active material, a conductive material, and a binder are dispersed in an appropriate (or suitable) organic solvent (such as N-methyl-2-pyrrolidone) to prepare positive electrode slurry, and the positive electrode slurry is then coated on a current collector 21, followed by drying and compressing, thus manufacturing the positive active material layer 22. A density of the positive active material layer 22 after compression is not particularly limited, and may be any density suitable for use in a positive active material layer for a rechargeable lithium ion battery.

The negative electrode 30 may include a current collector 31 and a negative active material layer 32 disposed (e.g., positioned) on the current collector 31.

The current collector 31 may be any suitable conductor (e.g., may be formed of any suitable conducting material), for example, copper (Cu), a copper alloy, aluminum, stainless steel, nickel plated steel, and/or the like.

The negative active material layer 32 includes a negative active material and the compound represented by Chemical Formula 1 as the first additive, and may further include a binder, and a second additive ($LiSO_3F$ and/or LiFSI).

The compound represented by Chemical Formula 1 as the first additive may be present in an amount of greater than or equal to about 0.01 parts by weight and less than or equal to about 1 part by weight based on 100 parts by weight of the negative active material in the negative electrode 30.

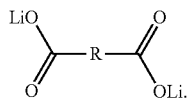

Chemical Formula 1

In Chemical Formula 1, R may be selected from a single bond, a substituted or unsubstituted C1 to C4 alkylene group, a substituted or unsubstituted C1 to C4 haloalkylene group, a substituted or unsubstituted C2 to C4 alkynylene group, and a substituted or unsubstituted C2 to C4 alkynylene group. Herein, the haloalkylene group refers to an alkylene group in which at least one hydrogen atom is substituted with a halogen atom.

In some embodiments, R may be a single bond or a substituted or unsubstituted C1 to C4 alkylene group.

For example, the compound represented by the above Chemical Formula 1 may be lithium oxalate, lithium succinate, and/or the like.

The negative active material layer 32 including the compound represented by Chemical Formula 1 may selectively decompose the compound represented by Chemical Formula 1 such that a film of the decomposition product of the compound of Chemical Formula 1 may be formed on the negative active material layer (e.g., on or near the surface of the negative active material layer).

The negative active material may include one or more selected from a carbon-based material, a silicon-based material, a tin-based material, a lithium metal oxide, and metal lithium. The carbon-based material may be, for example, a graphite-based material such as artificial graphite, natural graphite, a mixture of artificial graphite and natural graphite, natural graphite coated with artificial graphite, and/or the like. The silicon-based material may be, for example silicon, a silicon oxide, a silicon-containing alloy, a mixture of the silicon-based material and the graphite-based material, and/or the like. The silicon oxide may be represented by SiOx (where 0<x≤2). The tin-based material may be, for example, tin, tin oxide, a tin-containing alloy, a mixture of the tin-based material and the graphite-based material, and/or the like. The lithium metal oxide may be, for example, lithium titanium oxide compound such as $Li_4Ti_5O_{12}$.

For example, a negative active material according to one embodiment may include the silicon-based material and the carbon-based material.

The negative active material including the silicon-based material and the carbon-based material may intercalate and deintercalate more lithium ions and thus may improve battery capacity. However, such negative active material may also have a large volume change during the intercalation and deintercalation of the lithium ions and thus may deteriorate cycle characteristics of the battery. According to one embodiment, the negative active material may include the compound represented by Chemical Formula 1 (as a first additive) and $LiSO_3F$ and/or LiFSI (as a second additive), and thus may maintain (or substantially maintain) battery capacity during repetitive charges and discharges. Accordingly, in the rechargeable lithium battery 10 including the negative active material according to embodiments of the present disclosure, high battery capacity may be realized, even when the negative active material includes the silicon-based material and the carbon-based material.

The binder for the negative active material layer 32 may be the same as the binder included in the positive active material layer 22.

An amount of the binder is not particularly limited, and may be any amount suitable for use in a negative active material layer of a rechargeable lithium battery.

The negative electrode 30 may be, for example, manufactured via the following method. First, the negative active material, the compound represented by Chemical Formula 1, $LiSO_3F$ and/or LiFSI, and the binder are dispersed into a solvent (such as water an/or the like) to prepare slurry, and the slurry is then coated on the current collector 31, dried, and compressed. A density of the negative active material layer 32 after compression is not particularly limited.

The separator layer 40 includes a separator 41 and an electrolyte solution 43.

The separator 41 is cot particularly limited and may be any separator suitable for use in a rechargeable lithium battery.

The separator 41 may include a porous layer or a nonwoven fabric having excellent high-rate discharge performance, each of which may be used singularly or in a mixture thereof.

In some embodiments, the separator 41 may be coated with an inorganic material (such as $Al_2O_3$, $Mg(OH)_2$, $SiO_2$ and/or the like), and may include the inorganic material as a filler.

The separator 41 may be made of a material such as, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and/or the like. The polyolefin-based resin may be, for example, polyethylene, polypropylene, and/or the like, and the polyester-based resin may be, for example, polyethylene terephthalate, polybutylene terephthalate, and/or the like.

A porosity of the separator is not particularly limited, and may be any porosity of a separator suitable for use in a rechargeable lithium battery.

The electrolyte solution 43 may include a lithium salt and a solvent, and may further include the second additive ($LiSO_3F$ and/or LiFSI).

The $LiSO_3F$ and/or LiFSI may be included in an amount of greater than or equal to about 0.1 wt % and less than or equal to about 2 wt % based on the total weight of the electrolyte solution in the electrolyte solution 43. In some embodiments, when the $LiSO_3F$ and/or LiFSI is not included in the electrolyte solution 43, the $LiSO_3F$ and/or LiFSI may be used in the negative active material layer 32 in an amount of greater than or equal to about 0.1 wt % and less than or equal to about 2 wt % based on the total weight of the electrolyte solution. In other words, in the rechargeable lithium battery 10 according to one embodiment, the $LiSO_3F$ and/or LiFSI may be used in an amount of greater than or equal to about 0.1 wt % and less than or equal to about 2 wt % based on the total weight of the electrolyte solution in either one selected from the electrolyte solution 43 and the negative active material layer 32.

In some embodiments, the $LiSO_3F$ and/or LiFSI is incorporated into a film formed on the negative electrode 30 by a decomposition product of the compound represented by Chemical Formula 1 as the first additive, and the addition of $LiSO_3F$ and/or LiFSI may realize the film having excellent ion conductivity. Accordingly, the rechargeable lithium battery 10 according to one embodiment may selectively form a film having excellent ion conductivity on the negative electrode 30, and thus may suppress or reduce volume change of the negative active material as well as secure or maintain ion conductivity during repetitive charges and discharges. Accordingly, cycle-life characteristics of the rechargeable lithium battery 10 according to embodiments of the present disclosure may be improved.

The lithium salt may be an electrolyte of the electrolyte solution 43. The lithium salt may be, for example, $LiPF_6$, $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, LiI, LiCl, LiF, $LiPF_5(SO_2CF_3)$, $LiPF_4(SO_2CF_3)_2$, and/or the like. One or more of these lithium salts may be dissolved (e.g., in a solvent).

A concentration of the lithium salt is not particularly limited, and may be, for example, about 0.8 to about 1.5 mol/L.

The solvent may be a non-aqueous solvent in which the lithium salt and the additives may be dissolved.

The solvent may be selected from cyclic carbonate esters (such as propylene carbonate, ethylene carbonate, butylene carbonate, chloroethylene carbonate, vinylene carbonate, and/or the like); linear carbonates (such as dimethyl carbonate, diethyl carbonate, ethylmethyl carbonate, and/or the like); cyclic esters (such as γ-butyrolactone, γ-valerolactone, and/or the like); linear esters (such as methyl formate, methyl acetate, butyric acid methyl, and/or the like); tetrahydrofuran and/or a derivative thereof; ethers (such as 1,3-dioxane, 1,4-dioxane, 1,2-dimethoxy ethane, 1,4-dibutoxyethane, methyl diglyme, and/or the like); nitriles (such as acetonitrile, benzonitrile, and/or the like); dioxolane and/or a derivative thereof; and ethylene sulfide, sulfolane, sultone, and/or derivatives thereof, each of which may be used singularly or as a mixture of two or more, without limitation. When the non-aqueous solvent includes a mixture two or more solvents, a mixing ratio of each solvent may be any mixing ratio suitable for use in a rechargeable lithium battery.

A rechargeable lithium battery 10 according to one embodiment may include halogen-substituted cyclic carbonate as the solvent. The halogen-substituted cyclic carbonate may include, for example, 4-fluoro-1,3-dioxolan-2-one.

The electrolyte solution 43 may further include one or more additives such as a negative electrode SEI (solid electrolyte interface) forming agent, a surfactant, and/or the like, in addition to the second additive ($LiSO_3F$ and/or LiFSI).

Non-limiting examples of such additives may include succinic anhydride, lithium bis(oxalate)borate, lithium tetrafluoroborate, a dinitrile compound, propane sultone, butane sultone, propene sultone, 3-sulfolene, fluorinated arylether, fluorinated acrylate, and the like.

The additives may each independently be used in any content or amount suitable for use in a rechargeable lithium battery.

Hereinafter, a method of manufacturing a rechargeable lithium battery 10 is described. However, the method of manufacturing a rechargeable lithium battery is not limited to the following method and may include any suitable manufacturing method.

The positive electrode 20 may be manufactured as follows. First, a positive active material, a conductive material, and a binder are mixed and then dispersed into N-methyl-2-pyrrolidone, thus preparing a slurry. Subsequently, the slurry is coated on the current collector 21 and dried, thus forming the positive active material layer 22. Herein, the coating method is not particularly limited, and may be performed by using, for example, a knife coater, a gravure coater, and/or the like. In the following manufacturing example, the same coating method may be used. Subsequently, the positive active material layer 22 is compressed with a press to have a desired (or suitable) density, thus manufacturing the positive electrode 20.

The negative electrode 30 may be manufactured by the same (or substantially the same) method as the method of manufacturing the positive electrode 20. For example, a negative active material, a compound represented by Chemical Formula 1 as a first additive, and a binder are mixed in a desired (or suitable) ratio and then dispersed into a solvent (such as water and/or the like), thus preparing a slurry. Herein, $LiSO_3F$ and/or LiFSI as a second additive may be added to the slurry. If the $LiSO_3F$ and/or LiFSI is not added to the slurry, it may be added to an electrolyte solution 43. Subsequently, the slurry is coated on the current collector 31 and dried, thus forming the negative active material layer 32. Subsequently, the negative active material layer 32 is compressed with a press to have a density within the desired (or suitable) range, thus forming the negative electrode 30.

In embodiments where metal lithium is used as the negative active material layer 32, a thin metal lithium film may be overlapped (e.g., positioned) on the current collector 31.

Then, the separator 41 is inserted between the positive electrode 20 and the negative electrode 30 (prepared as described above), thus manufacturing an electrode structure. The electrode structure may be shaped to have a desired (or suitable) shape, for example, a cylinder electrode structure, a prism electrode structure, a laminate type (e.g., a laminate electrode structure), a button type (e.g., a button electrode structure), and/or the like, and then is inserted into a container having the same shape as that of the electrode structure. The electrolyte solution 43 is inserted into the container and impregnated into the pores (e.g., into each pore) in the separator 41. Accordingly, the rechargeable lithium battery 10 is manufactured.

Hereinafter, the embodiments of the present disclosure are illustrated in more detail with reference to examples. These examples, however, are provided for illustrative purposes and should not be interpreted as limiting the scope of the invention. Furthermore, what is not described in this disclosure should be apparent to those skilled in the art of rechargeable lithium batteries and will not be illustrated here.

Example 1

A positive active material layer was formed by dispersing 97.5 wt % of $LiCoO_2$, 1 wt % of polyvinylidene fluoride, and 1.5 wt % of conductive carbon into N-methyl-2-pyrrolidone to prepare a slurry, coating the slurry on an aluminum foil as a current collector, and drying it. Subsequently, the positive active material layer was compressed with a press to have a density of 4.2 g/cm$^3$, thus manufacturing a positive electrode.

To prepare a negative active material, slurry was prepared by mixing 20 wt % of a silicon alloy (containing 70 atom % of silicon), 75 wt % of graphite, and 5 wt % of lithium polyacrylate in water. Herein, 0.01 parts by weight of lithium oxalate (as the compound represented by Chemical Formula 1) based on 100 parts by weight of the total weight of the silicon alloy and the graphite was added to the slurry. Subsequently, the slurry was coated on a copper foil as a current collector and dried, thus forming a negative active material layer. The negative active material layer was compressed with a press to have a density of 1.6 g/cm$^3$, thus manufacturing a negative electrode.

A porous polyethylene film (a thickness of 12 μm) was used as a separator, and the separator was disposed (positioned) between the positive and negative electrodes, thus manufacturing an electrode structure, and the electrode structure was inserted into a battery case.

An electrolyte solution was prepared by mixing ethylene carbonate (EC), diethylcarbonate (DEC), and ethylmethyl carbonate (EMC) in a volume ratio of 30:20:50 to obtain a mixed solvent, and dissolving lithium hexafluoro phosphate (LiPF$_6$) in a concentration of 1.0 mol/L in the mixed solvent. Then, 1 wt % of LiFSI as a second additive based on the total weight of the electrolyte solution (EC+DMC+EMC+LiPF$_6$) was added thereto.

Subsequently, the electrolyte solution having the above-described composition was inserted into the battery case and impregnated into the pores (e.g., into each pore) in the separator, thus manufacturing a rechargeable lithium battery cell.

Examples 2 to 7 and Comparative Examples 1 to 5

Each rechargeable lithium battery cell according to Examples 2 to 7 and Comparative Examples 1 to 5 was manufactured according to the same (or substantially the same) method as Example 1 except for changing the contents of the additives as shown in Table 1. In Example 7, 0.1 parts by weight of lithium succinate (as the compound represented by Chemical Formula 1) were used, instead of the lithium oxalate, based on 100 parts by weight of the negative active material, that is, the total weight of the silicon alloy and the graphite.

Examples 8 to 13 and Comparative Examples 6 to 9

A rechargeable lithium battery cell according to Example 8 was manufactured according to the same (or substantially the same) method as Example 1, except that LiSO$_3$F was used instead of the LiFSI.

Each rechargeable lithium battery cell according to Examples 9 to 13 and Comparative Examples 6 to 9 was manufactured according to the same (or substantially the same) method as Example 8, except for changing the contents of the additives as shown in Table 2.

Evaluation 1: Cycle-Life Test

Discharge capacity retention of each rechargeable lithium battery cell according to Examples 1 to 13 and Comparative Examples 1 to 10 was evaluated.

Specifically, each cell was twice charged and discharged at current density of 0.4 mA/cm$^2$ between 4.4 V and 3.0 V at a temperature of 25° C. The charge and discharge were repeated at 25° C. and a current density of 4.0 mA/cm$^2$ between 4.4 V and 3.0 V. Herein, the discharge capacity retention of the cell was calculated by dividing discharge capacity after 100$^{th}$ cycle of the charge and discharge by discharge capacity after the first cycle charge and discharge. The results are provided in Tables 1 and 2.

Table 1 shows the evaluation results of the rechargeable lithium battery cells of Examples 1 to 7 and Comparative Examples 1 to 6 including LiFSI as a second additive to an electrolyte solution, and Table 2 shows the results of the rechargeable lithium battery cells of Examples 8 to 13 and Comparative Examples 6 to 9 including LiSO$_3$F as a second additive to an electrolyte solution.

TABLE 1

| | Amount (wt %) | | | Discharge capacity retention (%) |
|---|---|---|---|---|
| | lithium oxalate | lithium succinate | LiFSI | |
| Example 1 | 0.01 | — | 1 | 74 |
| Example 2 | 0.1 | — | 1 | 78 |
| Example 3 | 1 | — | 1 | 76 |
| Example 4 | 0.5 | — | 0.1 | 77 |
| Example 5 | 0.5 | — | 1 | 79 |
| Example 6 | 0.5 | — | 2 | 78 |
| Example 7 | — | 0.1 | 1 | 74 |
| Comparative Example 1 | — | — | — | 62 |
| Comparative Example 2 | 0.001 | — | 1 | 65 |
| Comparative Example 3 | 2 | — | 1 | 60 |
| Comparative Example 4 | 0.5 | — | 0.05 | 64 |
| Comparative Example 5 | — | — | 3 | 63 |
| Comparative Example 6 | 1 | — | — | 64 |

In Table 1, the amounts of the lithium oxalate and the lithium succinate as first additives are provided as a weight ratio based on 100 parts by weight of a negative active material, and the amounts of the LiFSI and the LiSO$_3$F as second additives are provided as a weight ratio based on the total weight of the electrolyte solution (EC+DMC+EMC+LiPF$_6$). In addition, "-" in Table 1 refers to no additive being added.

Referring to Table 1, the rechargeable lithium battery cells of Examples 1 to 7 showed improved discharge capacity retention, as compared with those of Comparative Examples 1 to 6. Accordingly, the rechargeable lithium battery cells according to Examples 1 to 7 including a compound represented by Chemical Formula 1 as a first additive in a negative electrode and LiFSI as a second additive in an electrolyte solution, according to embodiments of the present disclosure, showed improved cycle-life characteristics.

In addition, referring to Examples 1 to 3 and 7 and Comparative Examples 2 and 3, since the rechargeable lithium battery cells of Examples 1 to 3 and 7 included a compound represented by Chemical Formula 1 as a first additive within the range according to embodiments of the present disclosure, discharge capacity retention was improved, and thus cycle-life characteristics was improved. In contrast, the rechargeable lithium battery cells of Comparative Examples 2 and 3 included a compound represented by Chemical Formula 1 in an amount outside of the range of the present embodiments, and thus discharge capacity retention was not improved, and, accordingly, cycle-life characteristics were not satisfactory.

In addition, referring to Examples 4 to 6 and Comparative Examples 4 and 5, the rechargeable lithium battery cells of Examples 4 to 6 that included LiFSI as a second additive within the range according to embodiments of the present disclosure had improved discharge capacity retention, and thus cycle-life characteristics were improved. In contrast, since the rechargeable lithium battery cells of Comparative Examples 4 and 5 included the LiFSI in an amount outside of the range of the present embodiments, discharge capacity retention was not improved, and thus cycle-life characteristics were not satisfactory.

TABLE 2

|  | Amount (wt %) | | Discharge capacity retention (%) |
| --- | --- | --- | --- |
|  | lithium oxalate | LiSO₃F |  |
| Example 8 | 0.01 | 1 | 74 |
| Example 9 | 0.1 | 1 | 78 |
| Example 10 | 1 | 1 | 76 |
| Example 11 | 0.5 | 0.1 | 77 |
| Example 12 | 0.5 | 1 | 79 |
| Example 13 | 0.5 | 2 | 78 |
| Comparative Example 7 | 0.001 | 1 | 65 |
| Comparative Example 8 | 2 | 1 | 60 |
| Comparative Example 9 | 0.5 | 0.05 | 64 |
| Comparative Example 10 | 0.5 | 3 | 63 |

Referring to Table 2, the rechargeable lithium battery cells of Examples 8 to 13 showed improved discharge capacity retention, as compared with the rechargeable lithium battery cells of Comparative Examples 7 to 10. Accordingly, the rechargeable lithium battery cells according to Examples 8 to 13 including a compound represented by Chemical Formula 1 as a first additive in a negative electrode and LiSO₃F as a second additive in an electrolyte solution, according to embodiments of the present disclosure, showed improved cycle-life characteristics.

In addition, referring to Examples 8 to 10 and Comparative Examples 7 and 8, the rechargeable lithium battery cells of Examples 8 to 10 included a compound represented by Chemical Formula 1 as a first additive within the range according to embodiments of the present disclosure, and thus showed improved discharge capacity retention and, accordingly, improved cycle-life characteristics. In contrast, the rechargeable lithium battery cells of Comparative Examples 7 and 8 included a compound represented by Chemical Formula 1 in an amount outside of the range of the present embodiments, and thus discharge capacity retention was not improved and, accordingly, cycle-life characteristics were unsatisfactory.

In addition, referring to Examples 11 to 13 and Comparative Examples 9 and 10, since the rechargeable lithium battery cells of Examples 11 to 13 included LiSO₃F as a second additive within the range according to embodiments of the present disclosure, discharge capacity retention was improved, and thus cycle-life characteristics were improved. In contrast, since the rechargeable lithium battery cells of Comparative Examples 9 and 10 included LiSO₃F in an amount outside of the range of the present embodiments, discharge capacity retention was not improved, and, accordingly, cycle-life characteristics were not satisfactory.

Based on the above, it is believed that cycle characteristics of a rechargeable lithium battery cell according to embodiments of the present disclosure may be improved by including a compound represented by Chemical Formula 1 as a first additive in an amount of greater than or equal to about 0.01 parts by weight and less than or equal to about 1 part by weight, based on 100 parts by weight of a negative active material in a negative electrode, and by adding LiFSI and/or LiSO₃F as a second additive in an amount of greater than or equal to about 0.1 wt % and less than or equal to about 2 wt %, based on the total weight of the electrolyte solution to the electrolyte solution.

As used herein, the terms "use," "using," and "used" may be considered synonymous with the terms "utilize," "utilizing," and "utilized," respectively.

As used herein, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and equivalents thereof.

DESCRIPTION OF SOME OF THE SYMBOLS 10 rechargeable lithium battery
20 positive electrode
21 current collector
22 positive active material layer
30 negative electrode
31 current collector
32 negative active material layer
40 separator layer
41 separator
43 electrolyte solution

What is claimed is:

1. A rechargeable lithium battery comprising:
a negative electrode comprising a negative active material comprising a silicon-based material and a carbon-based material; and
an electrolyte solution comprising a lithium salt,
wherein:
the negative electrode further comprises greater than or equal to about 0.01 parts by weight and less than or equal to about 1 part by weight of a compound represented by Chemical Formula 1, based on 100 parts by weight of the negative active material; and
at least one selected from the group consisting of the electrolyte solution and the negative electrode, further comprises greater than or equal to about 0.1 wt % and less than or equal to about 2 wt % of lithium fluorosulfonate and lithium bis(fluorosulfonyl)imide, based on the total weight of the electrolyte solution:

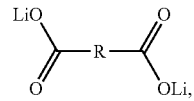

Chemical Formula 1 wherein, in Chemical Formula 1,
R is selected from a single bond, a substituted or unsubstituted C1 to C4 alkylene group, a substituted or unsubstituted C1 to C4 haloalkylene group, a substituted or unsubstituted C2 to C4 alkenylene group, and a substituted or unsubstituted C2 to C4 alkynylene group.

2. The rechargeable lithium battery of claim 1, wherein in Chemical Formula 1, R is a single bond or a substituted or unsubstituted C1 to C4 alkylene group.

3. The rechargeable lithium battery of claim 1, wherein the electrolyte solution further comprises a halogen-substituted cyclic carbonate.

4. The rechargeable lithium battery of claim 3, wherein the halogen-substituted cyclic carbonate comprises 4-fluoro-1,3-dioxolan-2-one.

5. The rechargeable lithium battery of claim 1, wherein the electrolyte solution comprises greater than or equal to about 0.1 wt % and less than or equal to about 2 wt % of lithium fluorosulfonate and lithium bis(fluorosulfonyl)imide, based on the total weight of the electrolyte solution.

6. The rechargeable lithium battery of claim 1, wherein the negative electrode comprises greater than or equal to about 0.1 wt % and less than or equal to about 2 wt % of lithium fluorosulfonate and lithium bis(fluorosulfonyl)imide, based on the total weight of the electrolyte solution.

7. A rechargeable lithium battery comprising:
a negative electrode comprising a negative active material comprising a silicon-based material and a carbon-based material; and
an electrolyte solution comprising at least one selected from the group consisting of $LiPF_6$, $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, LiI, LiCl, LiF, $LiPF_5(SO_2CF_3)$, $LiPF_4(SO_2CF_3)_2$, and combinations thereof,
wherein:
the negative electrode further comprises greater than or equal to about 0.01 parts by weight and less than or equal to about 1 part by weight of a compound represented by Chemical Formula 1, based on 100 parts by weight of the negative active material; and
at least one selected from the group consisting of the electrolyte solution and the negative electrode, further comprises greater than or equal to about 0.1 wt % and less than or equal to about 2 wt % of lithium fluorosulfonate and lithium bis(fluorosulfonyl)imide, based on the total weight of the electrolyte solution:

Chemical Formula 1

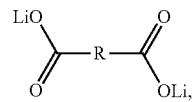

wherein, in Chemical Formula 1,
R is selected from a single bond, a substituted or unsubstituted C1 to C4 alkylene group, a substituted or unsubstituted C1 to C4 haloalkylene group, a substituted or unsubstituted C2 to C4 alkenylene group, and a substituted or unsubstituted C2 to C4 alkynylene group.

* * * * *